United States Patent
Kansky

(10) Patent No.: US 11,609,545 B2
(45) Date of Patent: Mar. 21, 2023

(54) METHOD AND SYSTEM FOR PREEMPTIVE PLANNING

(71) Applicant: Intrinsic Innovation LLC, Mountain View, CA (US)

(72) Inventor: Kenneth Alan Kansky, Union City, CA (US)

(73) Assignee: Intrinsic Innovation LLC, Mountain View, CA (US)

( * ) Notice: Subject to any disclaimer, the term of this patent is extended or adjusted under 35 U.S.C. 154(b) by 0 days.

(21) Appl. No.: 17/361,658

(22) Filed: Jun. 29, 2021

(65) Prior Publication Data

US 2022/0019188 A1 Jan. 20, 2022

Related U.S. Application Data

(60) Provisional application No. 63/154,502, filed on Feb. 26, 2021, provisional application No. 63/051,847, filed on Jul. 14, 2020.

(51) Int. Cl.
*G05B 19/40* (2006.01)
*G05B 19/402* (2006.01)
*G05B 19/408* (2006.01)

(52) U.S. Cl.
CPC ....... *G05B 19/402* (2013.01); *G05B 19/4083* (2013.01); *G05B 2219/39001* (2013.01); *G05B 2219/39155* (2013.01); *G05B 2219/39382* (2013.01)

(58) Field of Classification Search
CPC ............................. G05B 19/402; G05B 19/408
See application file for complete search history.

(56) References Cited

U.S. PATENT DOCUMENTS

| | | | |
|---|---|---|---|
| 11,010,697 B1 * | 5/2021 | Liu | G06Q 50/28 |
| 11,461,589 B1 * | 10/2022 | Bai | G06N 3/0454 |
| 2003/0167265 A1 | 9/2003 | Corynen | |
| 2005/0288819 A1 | 12/2005 | De | |
| 2006/0271381 A1 * | 11/2006 | Pui | G06Q 30/02 |
| | | | 705/7.13 |
| 2017/0102961 A1 | 4/2017 | Hilemon et al. | |

(Continued)

FOREIGN PATENT DOCUMENTS

JP 4571819 B2 8/2010

OTHER PUBLICATIONS

"Branch-prediction with State-machine", https://tams.informatik.uni-hamburg.de/applets/hades/webdemos/45-misc/05-fsm-editor/branch-prediction.html.

(Continued)

*Primary Examiner* — Kira Nguyen
(74) *Attorney, Agent, or Firm* — Fish & Richardson P.C.

(57) ABSTRACT

A method for preemptive control planning can include: optionally determining a graph that defines dependencies between behaviors; executing an execution plan for an executing behavior; generating a set of predictions with the executing behavior; propagating the set of predictions to child behaviors of the executing behavior; determining child execution plans and child predictions with the child behaviors; repeating the above for descendant behaviors of each child behavior; determining a realized world state associated with completion of the execution plan; and executing a child execution plan associated with a world state prediction matching the realized world state.

16 Claims, 10 Drawing Sheets

(56) References Cited

U.S. PATENT DOCUMENTS

| | | | |
|---|---|---|---|
| 2019/0213509 A1* | 7/2019 | Burleson | G06Q 10/06393 |
| 2020/0004583 A1* | 1/2020 | Kelly | G06N 20/00 |
| 2020/0027006 A1 | 1/2020 | Gupta et al. | |

OTHER PUBLICATIONS

Crosby, Matthew, et al., "Integrating Mission and Task Planning in an Industrial Robotics Framework", Proceedings of the Twenty-Seventh International Conference on Automated Planning and Scheduling (ICAPS 2017).

International Search Report and Written Opinion in International Appln. No. PCT/US21/39504, dated Dec. 30, 2021, 10 pages.

* cited by examiner

METHOD AND SYSTEM FOR PREEMPTIVE PLANNING

CROSS-REFERENCE TO RELATED APPLICATIONS

This application claims the benefit of U.S. Provisional Application No. 63/051,847 filed 14 Jul. 2020, and U.S. Provisional Application No. 63/154,502 filed 26 Feb. 2021, each of which is incorporated in its entirety by this reference.

TECHNICAL FIELD

This invention relates generally to the robotics field, and more specifically to a new and useful system and method for preemptive planning in the robotics field.

BACKGROUND

Most robotic control planners, by traditional design, compute an execution plan after a preceding behavior completes execution. This results in robot downtime while the execution plan is calculated. Consider, for instance, that there are two behaviors to execute, wherein a first behavior determines control instructions for grasping an object and a second behavior determines control instructions for inserting the object someplace else. The system can only plan and execute an insertion behavior after the system successfully executes a grasp behavior.

Thus, there is a need for a modularized mechanism that enables preemptive planning to reduce system downtime.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 1:
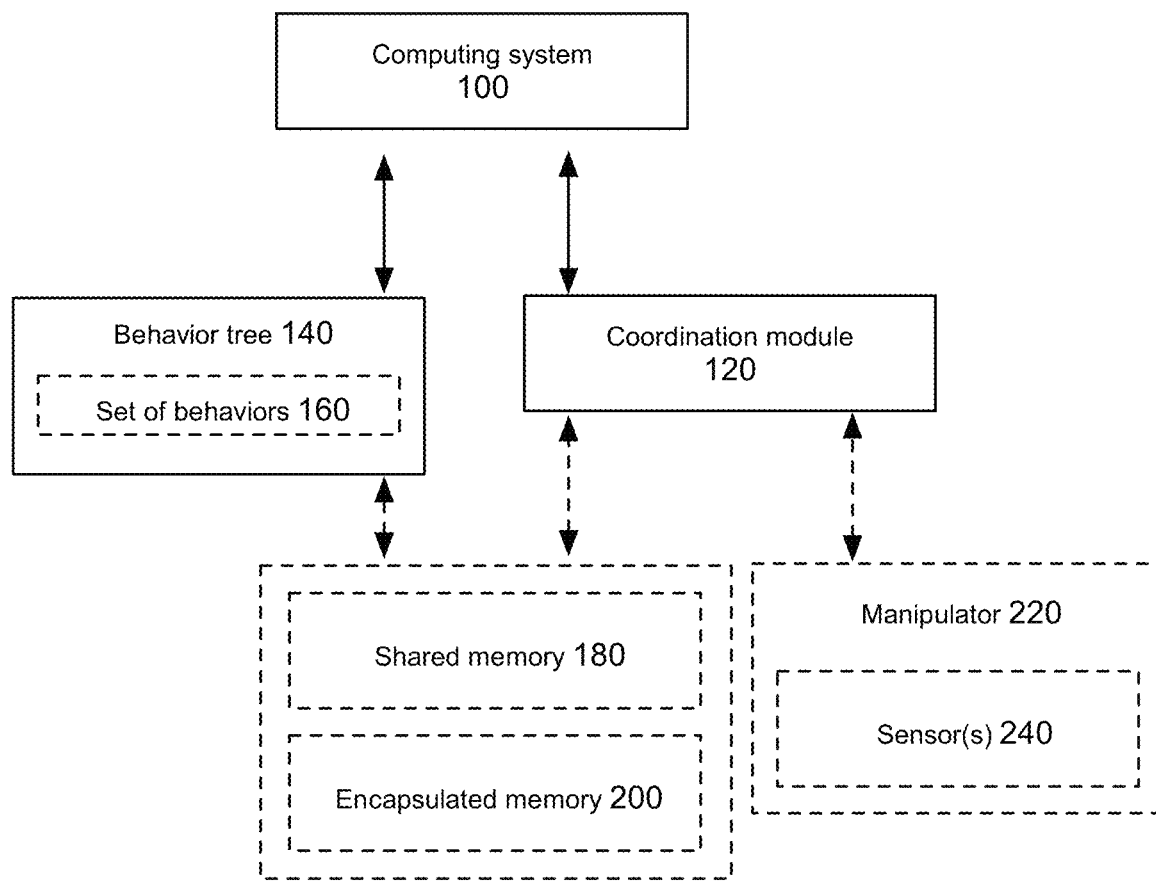
FIG. 1 is a schematic representation of the system.
Figure 2:
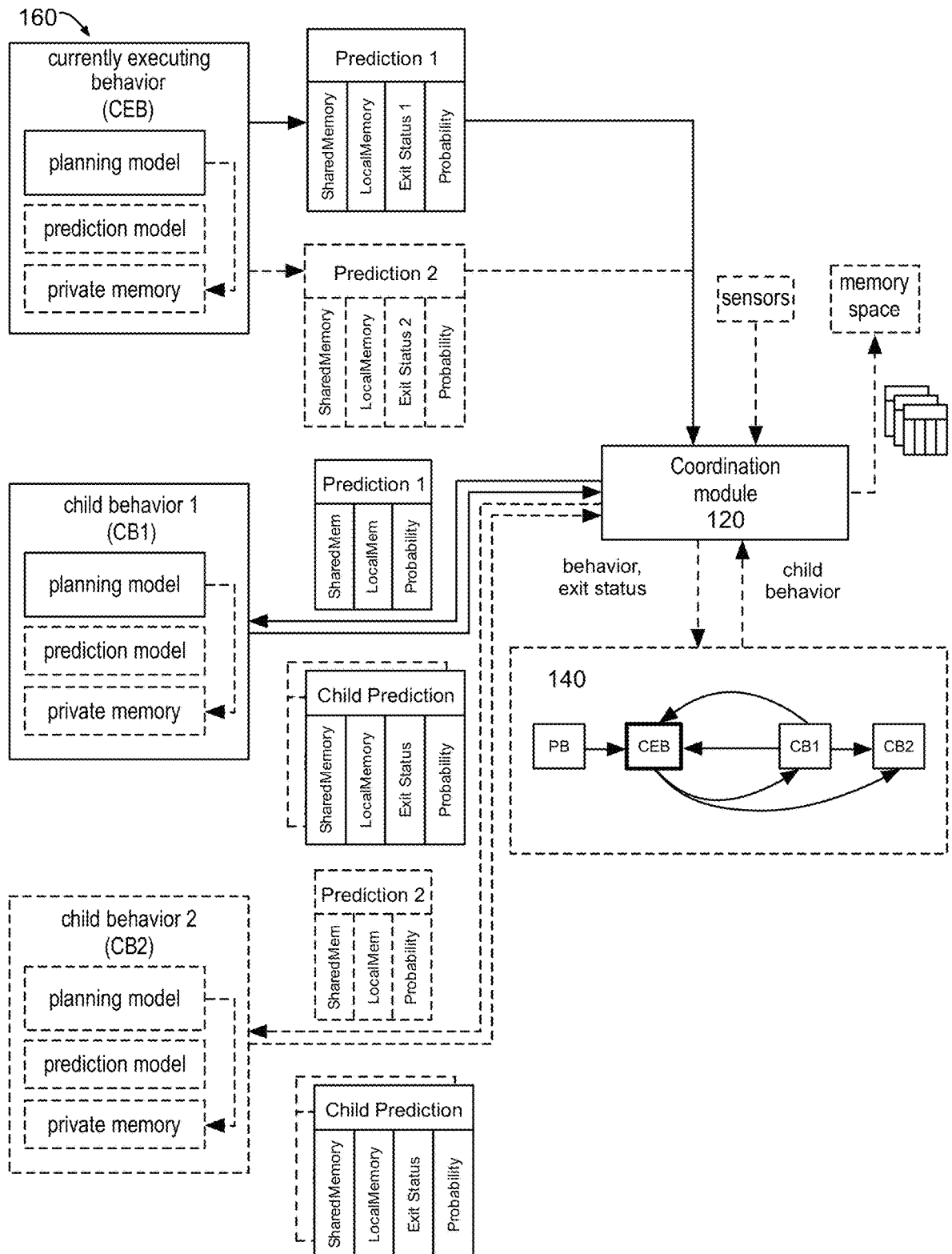
FIG. 2 is a schematic representation of the system.

As shown in FIG. 1 and FIG. 2, the system can include a coordination module 120; one or more graphs of behaviors 140; and a set of behaviors 160, each including a planning model (control-input model) and prediction model, but can additionally or alternatively include any other suitable models or other components.

The system functions to preemptively determine execution plans during execution of preceding behaviors.

In an example of system operation (e.g., shown in FIG. 2), a graph 140 (e.g., PRESMA (PRedictive Extended State MAchine)) defines a set of dependencies between behaviors, wherein each of the dependencies is associated with an exit status (e.g., a transition condition). In this example, the PRESMA includes a parent behavior (PB), a currently executing behavior (CEB), a child behavior 1 (CB1), a child behavior 2 (CB2), and/or any other behaviors. During upstream behavior (e.g., CEB) planning and/or execution (e.g., before upstream behavior execution completion), the upstream behavior can output: a prediction of a state at upstream behavior completion (e.g., a predicted manipulator state, a predicted world state, a predicted memory state, etc.); an exit status (e.g., used by the coordination module to route the predictions or otherwise decide which behavior will run next if the prediction is realized); a probability of occurrence (e.g., for the prediction-exit status pair; used by the coordination module, which can be included within or separate from the PRESMA; and/or used by the behavior to prioritize the prediction for analysis); and/or other information. The prediction can include: shared variables (e.g., predictions of SharedMemory state; variables used by other behaviors for their predictions); local variables (e.g., predictions of LocalMemory state; variables used by the same and/or other instances of the behavior); and/or other variables.

The coordination module 120 can identify the downstream behavior (e.g., CB1 and/or CB2) that is connected to the upstream behavior, via the prediction's exit status, and route the prediction (e.g., the shared variable values, optionally the local variable values, optionally the probability, etc.) to the downstream behavior. The downstream behavior can then generate an execution plan based on the prediction and can output a prediction of its own (second prediction), based on the first prediction. The coordination module can then repeat the process for the second prediction and subsequent behaviors. In variants, when a system state change is determined (e.g., from a sensor measurement, using a state estimator, etc.), the system state variables (within the predictions) that correspond to the changed system state can be updated with the newly-determined value. The changed predictions can be those from the currently executing behavior or downstream behaviors.

Figure 8:
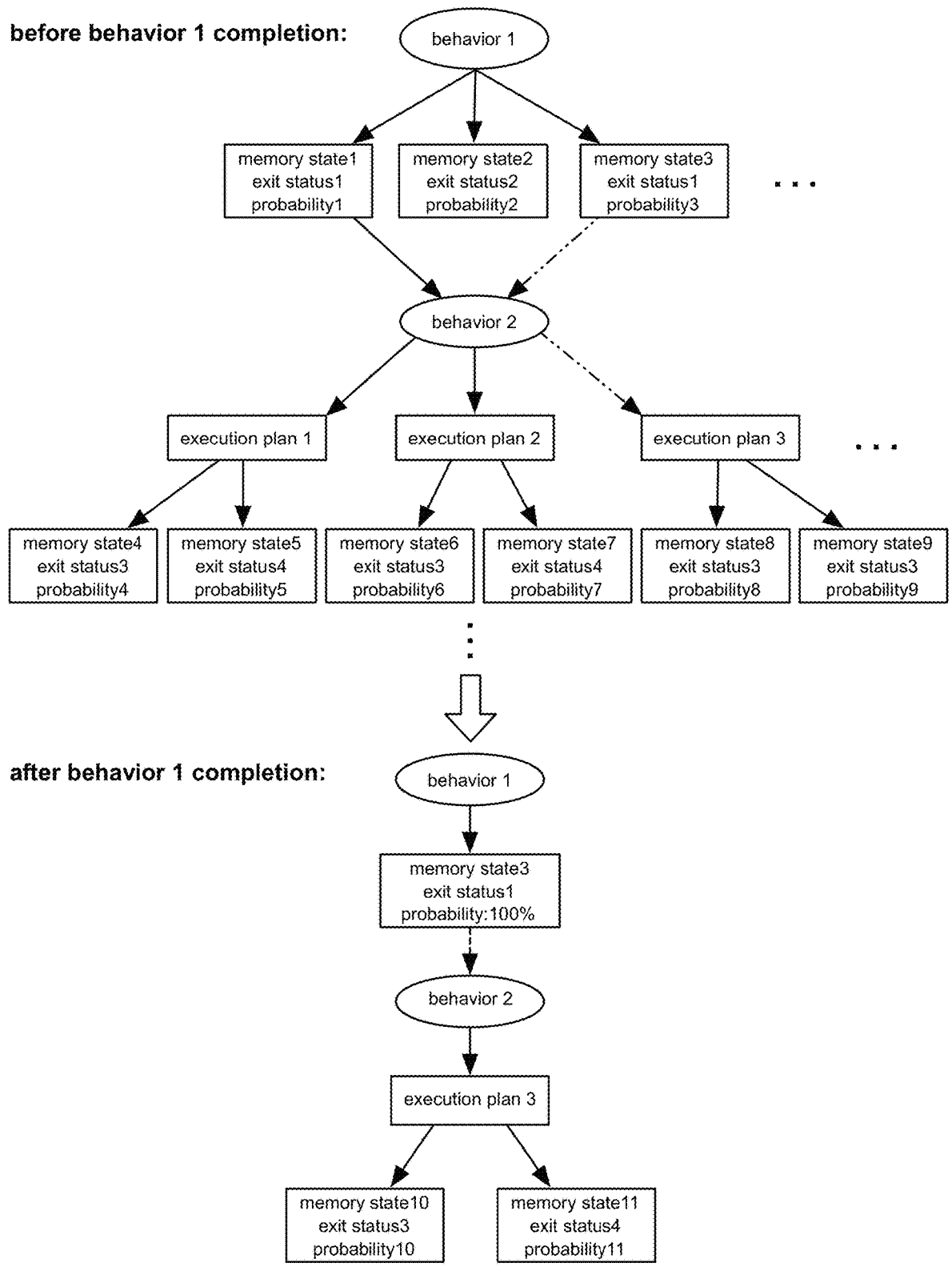
FIG. 8 is an illustrative example of plan execution after parent behavior completion.
Figure 9:
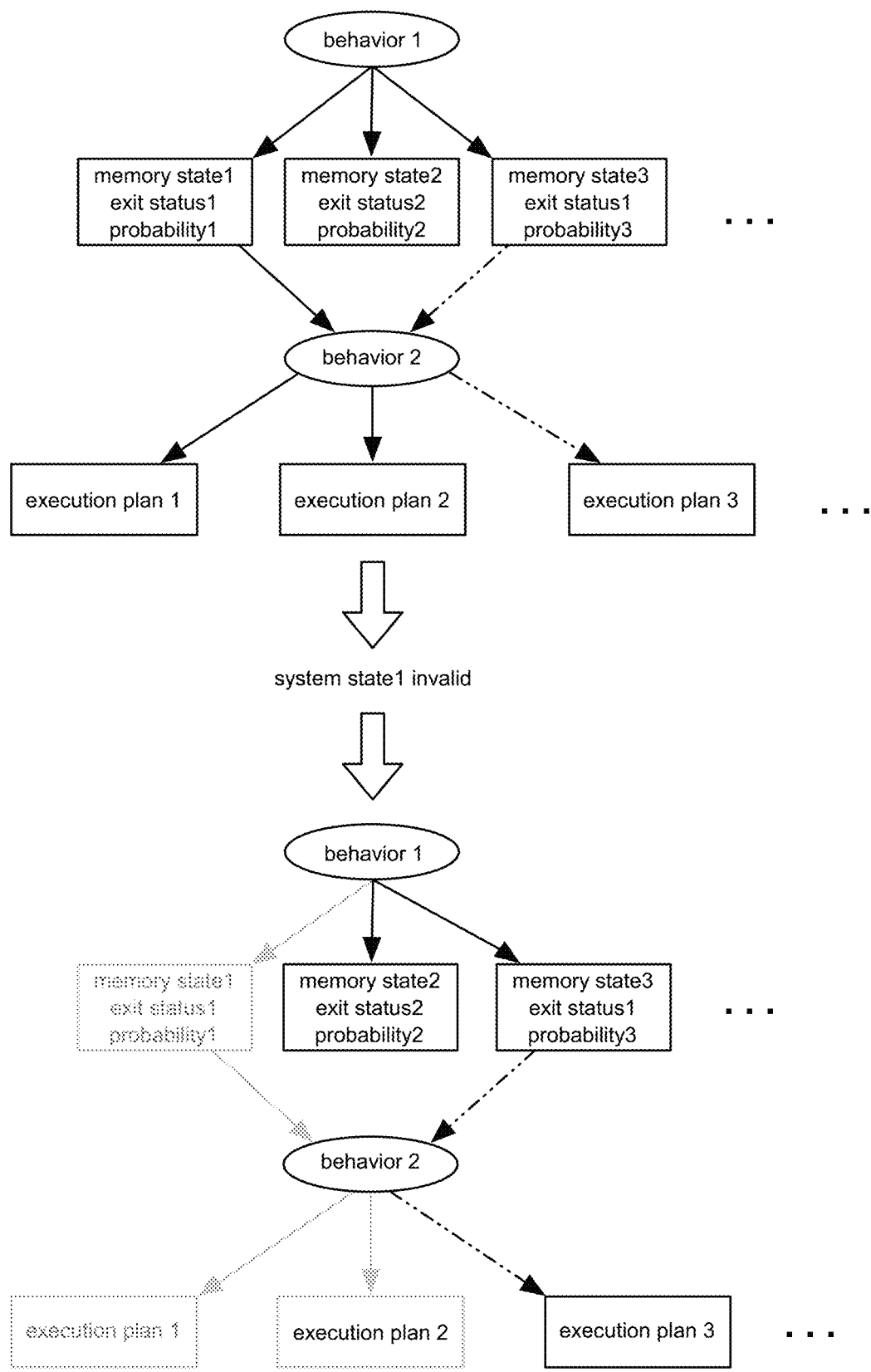
FIG. 9 is an illustrative example of plan pruning after prediction invalidation.

When the upstream behavior has finished executing, the upstream behavior can output a result (e.g., a realized system state, realized prediction). The downstream behavior can then retrieve and execute the execution plan associated with a prediction most closely matching the result, example shown in FIG. 8. The downstream behavior can output additional predictions during execution, update the previously-generated predictions' probabilities, and/or invalidate or remove prior predictions throughout downstream behavior execution. The coordination module and/or further-downstream behaviors can deprecate, delete, deprioritize, and/or otherwise manage execution plans associated with invalid predictions (example shown in FIG. 9).

2. Benefits

The method can confer several benefits over conventional systems.

First, variants of the system and method enable preemptive planning using graphs of behaviors. Graphs by design don't have a mechanism that enables preemptive planning for particular behavior execution at a future time. The system and method can plan motions for a robot in advance, which decreases overall run time by minimizing wasted time when the robot would otherwise need to pause to plan for the next movement. For example, the system can execute the execution plan (e.g., motion plan) that was preemptively planned for a particular behavior (e.g., while a preceding behavior was executing) instead of pausing to calculate an execution plan immediately before running a particular behavior. In particular, planning a downstream behavior (e.g., determining an execution plan for the behavior) can be faster than execution of an upstream behavior (e.g., physical, virtual, simulated, etc.), so one or more execution plans for downstream behaviors can be pre-planned based on the predictions output by the upstream behaviors during upstream behavior execution. When it's time for a downstream behavior to be executed, the downstream behavior can retrieve and execute the execution plan associated with the predicted memory state that most closely matches the realized memory state from the upstream behavior, instead of delaying the execution to compute the execution plan on-demand.

Second, in variants, the behaviors can be uninformed of the graph structure, wherein the coordination module controls all information routing between behaviors. This enables the system to be more flexible and modularized, since the behaviors don't need to be reprogrammed to be used in new graphs.

Third, in variants, the behaviors can themselves be graphs of behaviors, which can enable hierarchical composition of low-level behaviors to construct more abstract behaviors, wherein the abstract behaviors are then used in higher-level graphs.

However, the system and method can confer any other suitable benefits.

3. System

As shown in FIG. 1, the preemptive planning system can include: a coordination module 120; one or more graphs 140; and a set of behaviors 160, each including a planning model (control-input model) and a prediction model. However, the system for preemptive planning can additionally or alternatively include any other suitable components.

The coordination module 120 can function to: orchestrate behavior transitions for a graph; propagate predictions to behaviors of the graph; notify downstream behaviors of invalid or new predictions; update one or more variables of a prediction with a measured value (e.g., from a sensor), wherein the prediction is propagated to downstream behaviors after updating the variable; update one or more variables of a prediction with an estimated value (e.g., using a physics model, such as a Kalman filter, nonlinear Bayesian filter, etc.; a neural network; clustering algorithm; etc.); and/or any other suitable functionality. The coordination module can: receive predictions associated with exit statuses that are output by upstream behaviors of the set of behaviors; propagate the predictions to downstream behaviors associated with the respective exit statuses; and repeat receiving and propagating processes for descendants of the downstream behaviors. When the coordination module receives multiple predictions for propagations to downstream behaviors, the coordination module can prioritize prediction propagation for child execution plan planning and child state prediction generation. The predictions can be prioritized based on occurrence probability of the prediction, estimated time until execution of the behavior associated with the prediction, estimated planning time for the behavior (e.g., planning time of the execution plan) based on the prediction, and/or otherwise prioritized.

Figure 4:
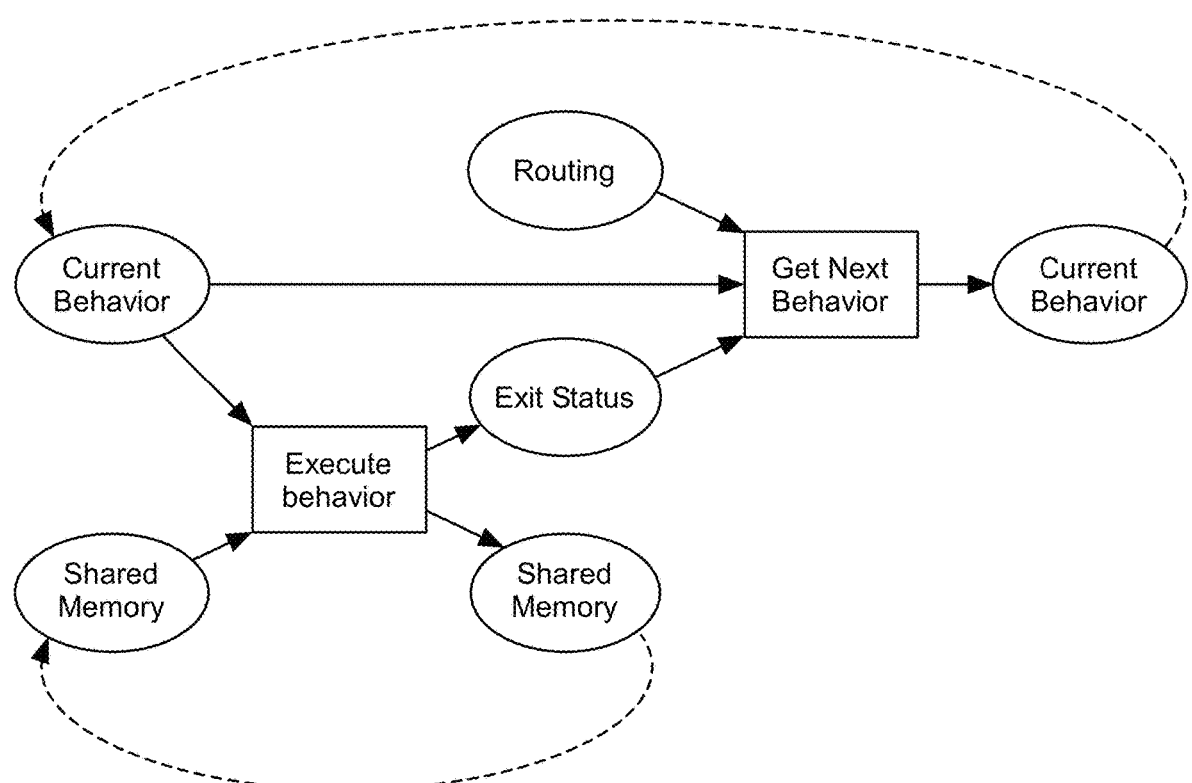
FIG. 4 depicts an embodiment of the system.

The system can include one or more coordination modules, which can function to orchestrate prediction routing (e.g., select which behavior to run next based on upstream behavior exit statuses). For example, an upstream behavior can output a prediction with an exit status, and the coordination module can select a downstream behavior based on the exit status (e.g., as shown in FIG. 4). The system can include one or more coordination modules for each graph, set of behaviors, or include any other suitable number of coordination modules. In a first example, the system includes a single graph and a single coordination module orchestrating prediction routing between behaviors identified in the graph. In a second example, the system includes a hierarchical graph, wherein one or more behaviors within a parent graph includes a child graph. In this example, the system can include a single coordination module that orchestrates prediction routing (e.g., variable value routing) within the child graph, within the parent graph, and between the parent and child graph. In a specific example, the coordination module routes shared variables predicted by the parent graph's behaviors between the parent graph's behaviors; routes encapsulated variables predicted by the child graph's behaviors between the child graph's behaviors; and provides local variables predicted by each behavior with the respective behavior (e.g., only). Alternatively, the system can include a parent and child coordination module, each orchestrating prediction routing within the parent and child graphs, respectively, and optionally sharing variable values as needed. However, any number of coordination modules can be used in any other suitable manner.

The coordination module is preferably continuously executing (e.g., throughout system operation), but can alternatively execute when a prediction is output by a behavior, or at any other suitable time.

The coordination module can include an outgoing listener that can function to listen for (e.g., receive) output predictions from behaviors (e.g., incoming predictions from upstream behaviors). The received output predictions can be routed to downstream behaviors for preemptive execution plan planning (e.g., while the upstream behaviors are executing). Execution plans can be preemptively computed by the coordination module based on variables associated with a particular downstream behavior, by the downstream behavior, by the graph itself, or by any other suitable component of the system. The coordination module can update an incoming prediction for a next behavior based on the output prediction, remove the incoming prediction (e.g., after a behavior finishes running, some subsequent predictions are no longer valid), mark an incoming prediction as the actual or true result, and/or otherwise manage the incoming predictions for next behaviors.

The coordination module can execute behaviors of the graph in series (e.g., a single behavior is executed at any particular time). Alternatively, the coordination module can contemporaneously or concurrently execute multiple behaviors at any particular time.

In a first example, a designated start behavior can be executed first. When the execution plan associated with the first behavior terminates, the start behavior outputs an exit status that is associated with one of the start behavior's outgoing edges, and that edge can dictate which behavior to run next. In a specific example, each behavior only outputs one exit status after execution plan termination, so no two behaviors can ever run simultaneously. When the graph has achieved a desired result or has given up trying, the coordination module can select a terminal behavior as a next behavior (e.g., outgoing edges associated with exit statuses can be directed to terminal behaviors). The terminal behavior preferably has no outgoing edges and does not determine predictions or execution plans, but can be otherwise configured.

The coordination module can additionally or alternatively update predictions propagated to downstream behaviors. For example, when a sensor measurement is received at the coordination module, a variable of a prediction propagated to a downstream behavior of a currently executing behavior can be updated with the measurement (e.g., currently measured value of a variable by one or more of the sensors of the system). However, the coordination module can be otherwise configured.

The graph 140 (e.g., in which each node corresponds to a behavior) can function to define a set of hierarchical dependencies between behaviors (e.g., wherein the dependencies are defined by edges, which can be associated with exit statuses) and/or provide any other suitable functionality.

The graph can be a directed multigraph, an acyclic graph, a cyclic graph, a hierarchical state machine, have a tree structure, and/or be any other suitable graph, ach node of the graph can correspond to a behavior, and each directed edge from an upstream node to a downstream node corresponds to an exit status. The behaviors can be built on states (e.g., world states), but can alternatively be built on tasks or otherwise constructed. The graph can include behaviors that each include a planning model and/or prediction model, but can additionally or alternatively include one or more behaviors that include lower-level graphs (e.g., cooperatively forming a hierarchical state machine), and/or be otherwise constructed.

The graph can be generated for an operation session (e.g., based on a high-level task, such as object manipulation, navigation, etc.), predetermined and retrieved from a repository, and/or otherwise determined. The graph is preferably known before an operation session, but can additionally or alternatively be determined during an operation session and/or at any other suitable time.

During, before, or after an operation session, the graph can optionally be modified. When the graph is modified (e.g., a new behavior is inserted into the graph, an existing behavior is removed from the graph, the existing behaviors are re-defined within the graph, etc.), the new behaviors can include updated exit statuses. The updated exit statuses can be associated with edges that define an updated routing, which can be used by the coordination module to route predictions. The new behavior can require all (or a subset) of variables output by a parent behavior to generate an execution plan and/or prediction. The new behavior can output all (or a subset) of variables needed for a child behavior. The new behavior can additionally or alternatively be otherwise configured. However, the graph can be otherwise modified.

Figure 10:
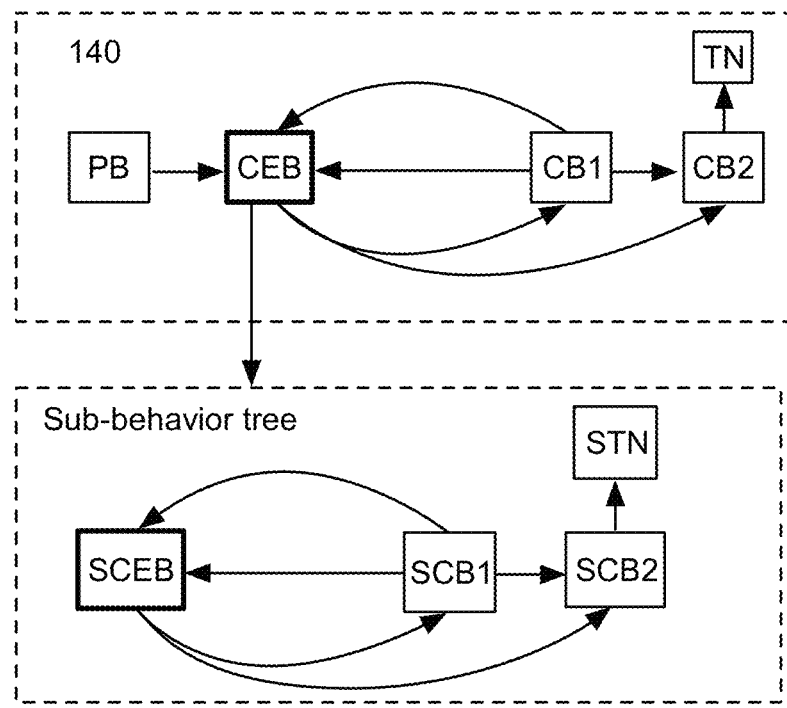
FIG. 10 depicts an embodiment of the method.

In a first variant, the graph can include a behavior that includes a sub-graph (e.g., as shown in FIG. 10), which can function to define a set of sub-hierarchical dependencies between sub-behaviors (e.g., wherein the dependencies are defined by edges, which can be associated with exit statuses) and/or provide any other suitable functionality. The behavior that includes the sub-graph can be an abstract task primitive whose performance requires lower-level task primitives of the sub-behaviors. The sub-graph can be a graph (PRESMA), a directed multigraph, and/or any other suitable graph. When the sub-graph is a directed multigraph, each node corresponds to a sub-behavior, and each directed edge from an upstream node to a downstream node corresponds to an exit status. The sub-graph can include behaviors that each include a planning model and/or prediction model, but can additionally or alternatively include one or more behaviors that include lower-level graphs), and/or be otherwise constructed. As shown in FIG. 10, the currently executing behavior (CEB) is a behavior in a graph. The graph can include a parent behavior (PB), a child behavior 1 (CB1), a child behavior 2 (CB2), and a terminal node (TN). The CEB behavior includes a sub-graph that includes behaviors: sub-currently executing behavior (SCEB), sub-child behavior 1 (SCB1), sub-child behavior 2 (SCB2), and a sub-terminal node (STN). In variants, the sub-graph can have multiple terminal nodes with different exit statuses. For example, if both SCB1 and SCB2 can exit with status "movement_failed" and each of these is routed to a terminal node, then these terminal nodes can have their own exit statuses for the sub-graph, such as "behavior_1_failed" and "behavior_2_failed".

However, the graph can be otherwise configured.

The set of behaviors 160 (e.g., behaviors in the graph) can generate predictions (e.g., predictions of the world state at associated execution plan completion) and/or execution plans based on upstream predictions (e.g., input predictions); effect change in the world state by facilitating execution of an execution plan associated with a realized upstream state; and/or provide any other suitable functionality.

For example, when a realized set of values (e.g., real state of the world) for the shared variables substantially matches a prediction, then the predetermined execution plan associated with (e.g., generated based on) the prediction is usable and can be executed. The realized set of shared variables substantially matching a prediction can include each of (or a subset of) the values of the prediction falling within a threshold range of the associated realized set of values (e.g., same or different range for each variable), when the realized set of variables are less than a threshold distance away from the prediction, and/or otherwise matched. Each behavior can execute based on one or more variables (e.g., local variables, shared variables, etc.), physical and/or simulated world measurements, and/or any other suitable information. In a specific example, a behavior that represents walking through a doorway can execute based on the angle that a door is open.

Each behavior is preferably a task primitive (e.g., configured to achieve a specific goal, subgoal, or high-level plan). A task primitive can include: robot primitives (e.g., configured to actuate the robot in a certain manner); motion primitives, any other decision primitives, and/or any other suitable primitives. Examples of behaviors include: grasping behaviors, insertion behaviors, press behaviors (e.g., button press, object movement by pressing on the object, etc.), movement behaviors (e.g., walk, run, etc.), lanekeeping behaviors, breaking behaviors, accelerating behaviors, stair climbing behaviors, and/or any other suitable behavior. However, the behaviors can be higher-order tasks (e.g., composed from sub-behaviors or task primitives) or otherwise constructed.

A behavior of the set can function to determine one or more output predictions (e.g., world state predictions) and/or one or more execution plans based on upstream predictions and/or realized world states. Each behavior preferably outputs predictions of the shared variables (e.g., memory representation of the world state outside of the behaviors, such as whether an object is held in a robot's end effector), but can additionally or alternatively, output predictions of local variables, or any other suitable variable.

The upstream predictions can include predictions of: shared variables, local variables, and/or other variables. The upstream predictions can include: predictions from one or more upstream (e.g., preceding) behaviors, individual parameters (e.g., preceding behavior state, counter, etc.), sensor data from the manipulator (e.g., measured or predicted), and/or any other suitable information. The upstream predictions can be retrieved (e.g., in response to a coordination module instruction to retrieve the predictions, etc.), received (e.g., wherein the behavior subscribes to an output feed associated with one or more upstream behaviors, wherein the behavior subscribes to sensor data, information associated with the parent behavior's identifier, etc.), and/or from otherwise obtained. The upstream predictions can be obtained from shared memory space, local memory space, and/or any other suitable memory space. The upstream predictions are preferably routed by the coordination module to the downstream behavior, but can be otherwise provided to the downstream behavior. The upstream predictions preferably include predictions associated with the exit status (of the dependency connecting the upstream and downstream behaviors); however, other information can be provided.

In a first variant, the upstream predictions can be a predicted output of a different behavior (e.g., predicted output of a previously executed behavior). One or more execution plans and/or predicted outputs can be calculated based on the upstream prediction received at the downstream behavior.

In a second variant, the upstream prediction can be a realized output prediction from a different behavior (e.g., a known input to the currently executing behavior). In this variant, the currently executing behavior can retrieve the predetermined execution plan associated with the value of the known input; execute the execution plan; optionally update the predicted outputs (e.g., output by the currently executing behavior) during execution plan execution; determine and output a known output of the currently executing behavior; and/or any other suitable elements. Alternatively, the currently executing behavior can generate an execution plan based on the realized output prediction (e.g., when a predetermined execution plan is associated with the realized output prediction), or otherwise manage the realized output prediction.

When multiple upstream predictions are available from upstream behaviors (e.g., the upstream behavior generated multiple predictions, different upstream behaviors generated different upstream behaviors, etc.), the upstream predictions can be prioritized to determine an order for computing preemptive plans based on: associated probability of occurrence, repetition frequency, estimated planning time, estimated execution time (e.g., time when execution is predicted to begin), and/or any other suitable metric. Alternatively, the upstream predictions can be unprioritized. The upstream predictions can be prioritized (e.g., for planning and prediction) by the coordination module, by the behavior, or by another system. For example, a behavior does not output a prediction if certain conditions are met (e.g., for predictions associated with plans more than a predetermined time into the future; when the prediction has a predetermined chance of occurring, such as less than 0.5% chance, less than 1% chance, less than 5% chance, etc.; and/or for any other suitable condition). However, the upstream behaviors can be otherwise defined.

A behavior can include: one or more planning models, one or more prediction models, and/or any other suitable model.

The planning model can function to generate an execution plan (e.g., control instructions) based on the upstream prediction. The planning model can be a: kinematic model, physics model, planner (e.g., grasp planner, insertion planner, trajectory planner, path planner, etc.), and/or any other suitable model. Different behaviors (e.g., different task primitives) can have different planning models, but can alternatively share planning models.

The execution plan can be a motion plan (e.g., series of actions, trajectory, pose), query plan (e.g., sequence of steps used to access data), and/or any other suitable plan. The execution plan can be stored by the behavior (e.g., in association with the parent behavior's prediction and/or prediction identifier) in: a private memory space (e.g., storage local to the behavior, variable values that are neither input nor output to the coordination module, etc.), a local memory space, a shared memory space, and/or otherwise stored.

When the execution plan is a motion plan, the execution plans can include instructions for manipulator control. For example, execution plans can include: robot movement and/or position, end effector movement and/or position, and/or any other suitable instructions. The execution plans can be cached in private memory within the behavior, saved internally (e.g., not relevant to downstream behaviors), and/or otherwise stored. The execution plan can be stored in association with: the input prediction, an input prediction identifier, a predicted output exit status, a probability of occurrence, a set of functions, equations, or weights for calculating any of the above, a unique identifier for the parent behavior instance (e.g., that generated the upstream prediction), and/or any other suitable information. One or more execution plans can be calculated for each input prediction set. Each execution plan can be computed based on one or more input predictions (e.g., shared variables) from upstream behaviors. However, the planning model can be otherwise configured.

The prediction model can function to determine a predicted state of the system and/or world (prediction) associated with completion of an execution plan (e.g., the execution plan generated by the behavior instance, as discussed above). The prediction model can also determine auxiliary parameters associated with each prediction. Examples of auxiliary parameters can include: a probability of the prediction occurrence, a confidence score for the prediction, an exit status (e.g., success, fail, etc.), a probability of the prediction-exit status pair, and/or any other suitable information. The prediction model can be: a physics model, state estimator (e.g., Kalman filter, neural network, particle filter, Monte Carlo simulation, Bayesian filter, etc.), neural network, lookup table, the planning model, or a different model. The predicted predictions can be determined based on: the upstream prediction, a predetermined execution plan, and/or other information. However, the prediction model can be otherwise configured.

Each behavior can generate one or more output predictions by any means while executing and/or before executing, and by any means given an upstream prediction. Additionally or alternatively, one or more output predictions can be generated based on an execution plan (e.g., variables that represent changes to the physical world after execution plan execution), wherein the execution plan execution is simulated using variables included in the upstream prediction. The output predictions are preferably generated using the prediction model, but can additionally or alternatively be generated using any other suitable model. The output prediction can include all variables of the upstream prediction, wherein the output prediction represents changes to the variables (e.g., after execution plan execution, after a period of time passing, etc.). Each behavior can generate a set of output predictions (e.g., one or more output predictions) for an upstream prediction received as input. For example, if the grasp behavior is uncertain about which in-hand pose will result after a successful grasp, the grasp behavior can output one result prediction per possible in-hand pose.

The predictions output by each behavior can optionally include: exit status (e.g., behavior success or failure; different classes that can be determined based on sensor data, such as temperature, distance, etc.; etc.), a probability of occurrence for each exit status and/or prediction pair, new memory states (e.g., realized predictions), and/or any other suitable information. However, the behavior can otherwise determine the execution plan and the predictions.

The predictions are preferably of physical world states or simulated world states, but can alternatively be of virtual world states, and/or any other suitable prediction. A world can represent a working environment that is acted on by the manipulator, include the manipulator, and/or otherwise defined. The world state can be represented by a set of variables that define the world at a particular point in time. The world state can include: 6DOF position and/or orientation of a manipulator; joint positions; state of charge, such as of a battery; kinematics (e.g., velocity, acceleration, etc.); fill height; workspace position; counters; subcomponent operation parameters; settings; limits; temperature; pressure; volume; mass; light; sound; and/or any other suitable variable. Predictions are preferably determined before behavior execution and/or behavior execution completion; realized predictions can be predictions that have been realized by the behavior after full execution. Predictions can be represented using vectors, matrices, arrays, dictionaries (e.g., variable and value pairs), and/or any other suitable data structure. However, predictions and realized predictions can be otherwise defined.

The predictions and/or execution plans are preferably identified by a unique identifier, but can alternatively be unidentified, be identified by a locally unique identifier, or otherwise identified. The predictions and/or execution plans can be stored in association with: an identifier for the associated behavior instance that they are generated from, the input prediction(s) that they were generated from, the identifier for the parent behavior instance(s) that provided the input prediction(s), and/or in association with any other suitable information. However, predictions and/or execution plans can be stored and/or shared in any other suitable manner.

The prediction can include: shared variables (e.g., globally shared variables, used by other graphs and behaviors; shared memory space), local variables (e.g., used by other instances of the behavior and/or the same instance; local memory space), and/or any other suitable variables; an exit status, wherein the exit status can include a predicted execution plan outcome (e.g., whether the goal associated with the behavior was achieved, such as success or failure); a probability of occurrence; a confidence score for the prediction; and/or any other suitable information.

In an example of the variables, the shared variables can include joint positions of a robot (e.g., accessible to every behavior), the local variables can include a queue of grasps to attempt for a specific grasp behavior, and the private memory can include cached motion plans for a specific behavior.

Each variable can be assigned a memory space by the coordination module (e.g., as a shared, local, or private variable); alternatively, the variables can be pre-classified, such as by the behaviors, which can classify the variables of their inputs and outputs with a variable type.

The shared variables are preferably routed to and/or used by one or more behaviors for planning and prediction. Examples of shared variables (e.g., shared memory, encapsulated memory, etc.) can include: manipulator poses, counters, epochs, timestamps, and/or other information. Specific examples of shared variables can include: joint angles, arm pose, end effector pose, planning scene, time of expected completion, any other suitable time, identifiers, counters, object pose, object orientation, surface frictions, restitution, visual features like colors, textures, material types, whether or not an object is rigid or deformable, allowed deformations of an object, indications of whether an object is supported by another (via gravity), whether objects are physically attached to each other, action affordance fields (e.g., possible object grasps, possible directions to push an object, etc.), and/or other variables. The shared variables can be determined and/or constructed by the behavior, by the coordination module, and/or otherwise determined. The shared variables can optionally include encapsulated variables, which can be accessible (e.g., routed, passed) to all behaviors in a graph, but not to higher level behaviors of parent graphs (e.g., when the graphs are hierarchical, such as when a behavior includes multiple child behaviors). However, the shared variables can be otherwise configured.

In a first variant, the shared variables can include encapsulated variables (e.g., hierarchy-specific shared variables, used by a particular behavior in a higher-level graph, wherein the particular behavior is a sub-graph; encapsulated memory space). In a specific example, the encapsulated variables are used by sub-behaviors that make up a sub-graph, wherein the sub-graph is a higher-level behavior in a higher-level graph. Other higher-level behaviors in the higher-level graph preferably don't access or modify the encapsulated variables of other sub-behaviors within the higher-level behavior, but can alternatively access the encapsulated variables.

Figure 5:
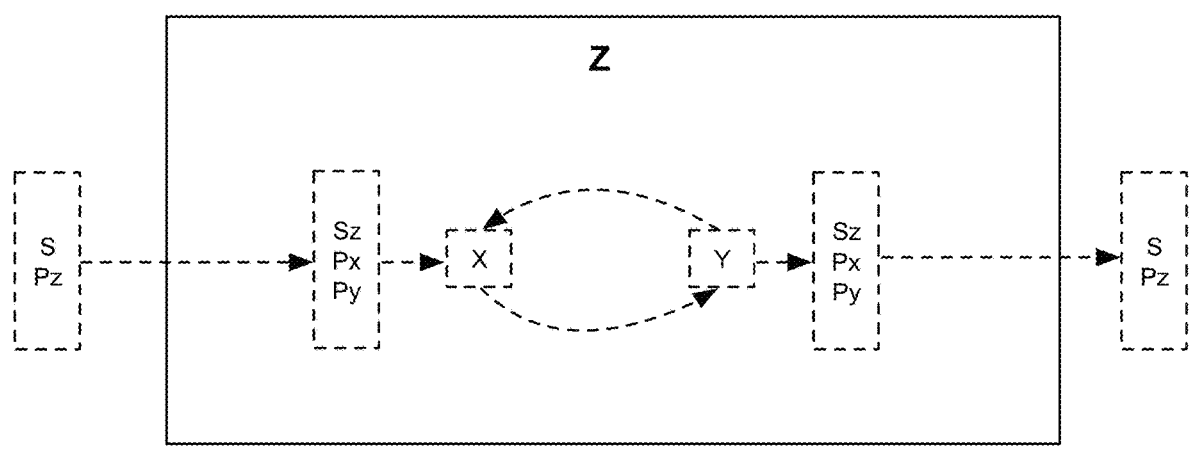
FIG. 5 depicts an embodiment of the system.

In a first example (e.g., as depicted in FIG. 5), behavior Z can include sub-behaviors X and Y, wherein behavior Z is also a graph. Behavior Z can send encapsulated memory (e.g., encapsulated variable values) to sub-behaviors X and Y, wherein the encapsulated memory can be combined with Sz so that neither X nor Y are aware of which variables Z is encapsulating. The input prediction to behavior Z can include local memory $P_Z$, which can include local memories $P_X$, and $P_Y$ of X and Y, respectively; shared memory S, and Z's encapsulated memory $S_z$, and/or other elements. The input prediction (or elements thereof) can be fed as input to behavior X. The output of behavior X can include encapsulated memory $S_z$ (e.g., accessible to both X and Y), shared memory, local memory $P_X$, or any other updated memory. The output of behavior Y (or elements thereof) can be included in the prediction output by behavior Z. Additionally, the prediction output by behavior Z can include an appended $P_x$, and/or any other information.

The local variables (e.g., stored in a local memory space) can be used to store variables for a specific behavior. Examples of local variables can include: counters, subcomponent operation parameters, world states (e.g., only relevant to the behavior), settings, limits, and/or other information. Specific examples of local variables can include: a number of grasp attempts, end effector orientations for possible grasp attempts, container height, insertion container contents, identifiers, time, predicted counter value, etc.), and/or any other suitable information. The local variables can affect how the behavior executes when run multiple times (e.g., by saving local variable values after the behavior finishes running and using the saved local variable values the next time the behavior runs). The local memory can be determined and/or constructed by the behavior, by the coordination module, and/or otherwise determined. However, the local variables can be otherwise configured.

The private variables (e.g., stored in private memory space) can be only accessible to a particular behavior instance, or alternatively accessible to other behavior instances. The private variables can persist within the behavior so that the private variables are accessible each time the behavior runs (e.g., executes), each time the behavior processes an incoming prediction to preemptively compute a plan, and/or otherwise accessible. The private variables can include variables (e.g., that are updated during and/or after behavior execution; updated during preemptive planning, regardless of whether the behavior is executing; and/or updated at any other suitable time); execution plans; and/or any other information. In a specific example, the private variables can include an execution plan and an associated upstream prediction that was used to generate the execution plan, such that when a realized world state matches the upstream prediction, the execution plan can be executed. The private variables can be different instances of the same local variable or shared variable, or be completely different from the local and shared variables. For example, a counter variable can be shared between private and local memory spaces, such that a behavior can maintain the current value of the counter in its private memory space and can also output a predicted value of the counter in every outgoing prediction. The private variables are preferably not exposed to any interfaces, but can additionally or alternatively be exposed to one or more interfaces (e.g., accessible to other behaviors). However, the private variables can be otherwise configured.

When a behavior executes, the behavior can use the planning model to output commands to the manipulator, and/or load the predetermined execution plan to the controller. Regardless of whether a behavior is executing, it can listen for upstream predictions. When a behavior receives an upstream prediction, it uses the planning model (and possibly the prediction model) to compute an execution plan, and it can use the prediction model and/or a planning model to output new predictions based on this execution plan.

However, a behavior can be otherwise configured.

The system can include a computing system 100 that functions to execute the coordination module 120, graphs 140, behaviors 160, and/or other components. The computing system 100 can include one or more CPUs, GPUs, TPUs, FPGAs, and/or any other suitable processing units. The computing system can include multiple processing units (e.g., up to 2, up to 4, up to 5, up to 6, up to 8, etc.) or a single processing unit. The computing system can be local to the physical system, remote from the physical system, distributed, and/or otherwise configured. The computing system can include multiple separate threads or a single thread. Different preplanning instances for a given behavior (e.g., for different predictions) can be run on the same or different thread(s). However, the computing system can be otherwise configured.

The memory spaces (e.g., shared, local, and private) can function to store predictions output by behaviors (e.g., entire prediction, only shared variables, etc.), execution plans with associated predictions that were used to generate the said execution plan, and/or any other suitable information. The memory spaces can be central memory or distributed across behaviors. The memory spaces can be implemented as structures or dictionaries with specific fields (e.g., for variables), wherein predictions (output by behavior instances) each contain instances of the variables with prediction-specific values. Alternatively, memories can be address spaces (e.g., that the fields are written to), and/or otherwise constructed. However, the memory spaces can be otherwise configured.

The system can be used with a manipulator 220, which functions to manipulate (e.g., act on) a world (e.g., surrounding environment or scene; represents a workspace, working environment, etc.; etc.) based on an execution plan, which can change the world state. The manipulator 220 (and world) can be physical or digital (e.g., simulated). The manipulator can include: an actuator (e.g., motor, end effector, etc.), set of sensors, and/or any other suitable set of components. The manipulator 220 can be: a robot (e.g., a robot arm with an end effector, humanoid robot, traversing through a physical space, traversing through a simulated space, etc.), a vehicle (e.g., aerial vehicle, terrestrial vehicle, aquatic vehicle, etc.), an industrial plant, an appliance, and/or any other suitable actor configured to interact with a world.

The robot can function to perform a set of control instructions from a set of behaviors. Examples of control instructions can include: positioning an end effector for grasping an object, inserting an object, opening a door, capturing an image, and/or other actions. However, the robot can be otherwise configured.

The end effector (e.g., suction gripper, finger gripper, etc.) preferably functions to grip an object. The end effector is preferably mounted to the robot arm. However, the end effector can be otherwise configured.

The system can optionally include one or more sensors 240, which function to monitor the world and/or manipulator 220. The sensor 240 can determine world state variable values, detect changes in a world state (e.g., world state variable), and/or be otherwise used. The sensors can be coupled to the physical and/or simulated system, the end effector, and/or any other suitable system. The sensors can be controlled by the computing system, and/or any other suitable system. The sensors can include: one or more cameras (e.g., 3D scanner, projected light, stereo camera, CMOS, CCD), depth sensors, lasers, weight sensor, force-torque sensor, pressure sensor, encoders, proximity sensors, motion detectors, light curtains, audio sensors, temperature sensors, power sensors (e.g., Hall effect sensors), inertial sensors (e.g., accelerators, gyroscope, magnetometer, etc.), and/or any other suitable sensor.

However, the system can be used with any other suitable components.

4. Method

Figure 3:
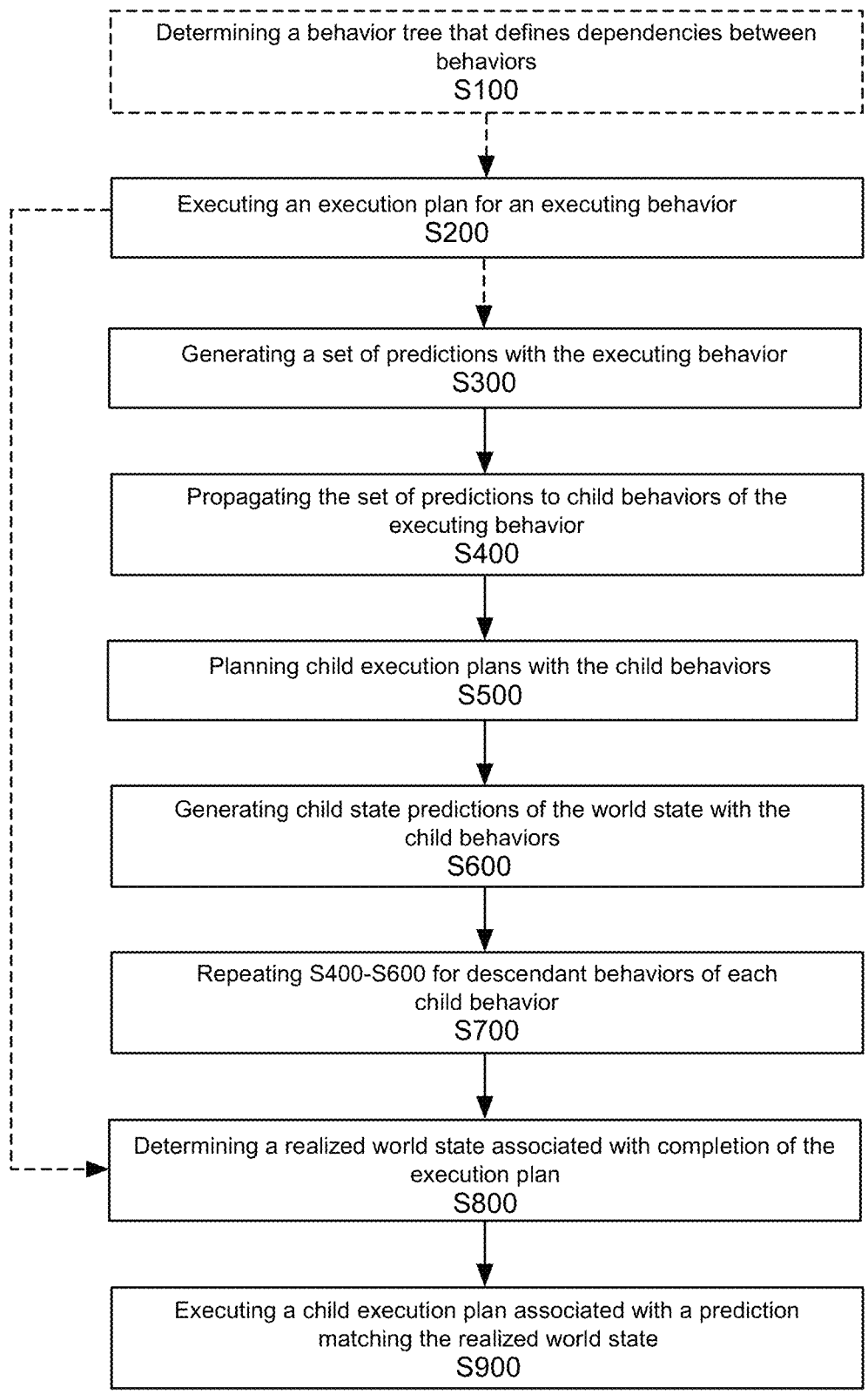
FIG. 3 is a schematic representation of the method.

As shown in FIG. 3, the method can include optionally determining a graph that defines dependencies between behaviors S100; executing an execution plan for an executing behavior S200; generating a set of predictions with the executing behavior S300; propagating the set of predictions to child behaviors of the executing behavior S400; planning child execution plans with the child behaviors S500; generating child predictions of the world state with the child behaviors S600; repeating S400-S600 for descendant behaviors of each child behavior S700; determining a realized world state associated with completion of the execution plan S800; and executing a child execution plan associated with a world state prediction matching the realized world state S900. However, the method can be otherwise performed.

Determining a graph S100 can function to provide the coordination module with a graph to use for preemptive planning. The graph can define a set of behaviors, a set of hierarchical dependencies between behaviors, and/or any other suitable information. The graph can be retrieved from a database, generated, learned (e.g., by classifying each of a series of behaviors from a sample execution; using one or more techniques disclosed in U.S. patent application Ser. No. 16/562,261, filed on 5 Sep. 2019, which is herein incorporated in its entirety by this reference; etc.), manually specified, and/or otherwise determined. However, the graph can be otherwise determined.

Executing an execution plan for an executing behavior S200 can function to change a world state by acting on a world. The executing behavior is preferably a behavior of the graph or a behavior of a sub-graph, but can additionally or alternatively be any other suitable behavior. The executing behavior can receive an upstream prediction (e.g., a world state predicted or realized by an upstream behavior, sensor measurements, etc.) and execute the plan based on the upstream prediction, and/or not receive an upstream prediction. The execution plan can be predetermined and retrieved from memory, but can alternatively be generated after upstream prediction receipt (e.g., using the execution model of the behavior) or otherwise determined. The execution plan can be identified by the coordinating module, the executing behavior, and/or by any other suitable component. The execution plan is preferably executed by the computing system, but can be executed by the manipulator 220 or by any other suitable system. For example, a controller executing on the computing system can control the manipulator 220 to operate according to the execution plan.

The execution plan is preferably retrieved based on the upstream prediction (e.g., based on the prediction identifier of the prediction that predicted the realized state; based on the world state variable values; etc.), but can be retrieved based on the identifier for the previous behavior that realized the world state, or otherwise retrieved. In a first variation, the predetermined execution plan associated with the prediction that predicted the realized state is executed by the executing behavior. In a second variation, the predetermined execution plan generated from an upstream prediction with values within a threshold distance of the realized output prediction (realized world state) is selected for execution. In this variation, each world state variable can have the same or different acceptable threshold distance (threshold deviation) for the prediction to be considered a match with the realized world state (e.g., a first variable can have a ±5% permitted variance, while a second variable can have a 0% permitted variance).

The execution plan can be from a set of execution plans generated for the current execution epoch (e.g., directly generated from the predictions output while a previously executing behavior was executing), from a set of cached execution plans (e.g., from prior execution epochs), and/or an execution plan generated at any other suitable time. Using execution plans from prior execution epochs can function to reuse already-generated (but potentially unexecuted) execution plans.

However, the execution plan can be otherwise selected.

The executing behavior can be a start behavior, a parent behavior, a child behavior, and/or any other suitable behavior of the graph or a sub-graph within the graph.

However, the execution plan can be otherwise executed.

Generating a set of predictions S300 can function to determine one or more predictions of the world state at execution plan completion. The set of predictions can be used by child behaviors to preemptively determine child execution plans to reduce system downtime. The set of predictions are preferably output by the executing behavior, but can be generated using an external prediction model (e.g., external the behavior), the coordination module, and/or any other suitable system.

The set of predictions are preferably generated while executing the execution plan (e.g., contemporaneously with S200), but can additionally or alternatively be performed after S200, and/or at any other suitable time. Predictions associated with different exit statuses can be generated in parallel or in series. Predictions associated with the same exit status and different real world states can be generated in parallel or in series.

Predictions can be dynamically updated as the system executes the execution plan (e.g., periodically every second, every 5 seconds, every 10 seconds, every 30 seconds, etc.), and/or at any other suitable time.

The predictions are preferably generated based on the: current (or prior) world state, the remaining portions of the execution plan, a received upstream prediction, the realized world state (e.g., current world state), sensor measurements, current system state, and/or any other suitable information. The predictions are preferably determined by the prediction model of the executing behavior, but can be determined by another system.

The predictions can include: shared variables, local variables, and/or any other suitable set of variables. The prediction can be generated using a simulation (e.g., a physics model), a state estimator, and/or any other suitable method.

One or more predictions can be generated for each execution plan. Different predictions can be generated for a given execution plan based on: different assumptions, different scenarios, different world states, different potential system responses, different variable values (e.g., generated using a random number generator, etc.), and/or otherwise generated.

In a first variant, the set of predictions can be generated using the prediction model of the executing behavior. For example, the prediction model can simulate how the current world state will change once the remainder of the execution plan is executed.

In a second variant, the set of predictions can be generated by querying a third-party model using the received upstream prediction, and receiving one or more predictions of the world state at execution plan completion, in response.

However, the set of predictions can be otherwise generated.

S300 can optionally include predicting the exit state associated with the execution plan. This can include evaluating whether the prediction substantially satisfies the goal of the behavior (e.g., "success") or does not satisfy the behavior goal (e.g., "failure"). The metrics for goal satisfaction can be predefined for each behavior, or be dynamically defined. The metrics for goal satisfaction can be manually determined, learned (e.g., from observing historical executions, each labelled with a given exit status), or otherwise determined. The metrics for goal satisfaction can include: which state variables to consider, what the target state variable value is, how the target state variable should be determined (e.g., calculated), what deviation from the target state variable value is permissible, and/or other information.

For example, an insertion behavior can have a goal of inserting a grasped object into a target location (the bounds of which can be provided by another behavior or determined from the world state). In this example, a "successful" exit state can be predicted when the simulated execution plan execution causes the grasped object to be wholly located within (e.g., collocated with) the target location, while a "failed" exit state can be predicted when the simulated execution plan execution causes the grasped object to be at least partially outside the target location. In a second example, the insertion behavior can have an additional goal of inserting the object in a specific orientation relative to the target location, wherein the exit state is "successful" if the simulation results in the object substantially having the target orientation (e.g., within a predefined deviation) within the target location, and "failed" if the simulation results in the object having a different orientation. However, the exit state can be otherwise determined.

S300 can optionally include identifying predictions that are no longer valid. Invalid predictions can be predictions that are: impossible to achieve given the current world state and the remaining execution plan; based on a predicted intermediate world state that was not realized; and/or otherwise defined. In a first variation, identifying invalid predictions includes communicating the identifiers for the invalid predictions to the coordination module. In a second variation, identifying invalid predictions includes notifying the coordination module that all predictions from the executing behavior sharing a set of state variable characteristics (e.g., variable values) should be invalidated, wherein the coordination module finds and invalidates matching predictions. However, the invalid predictions can be otherwise identified.

After invalid prediction identification, the coordination module can: mark the identified predictions as invalid; notify child behaviors that planned child execution plans and predictions based on the invalid predictions should be deprecated (e.g., deleted, ignored, etc.); mark the tree of child predictions resulting from the invalid prediction as invalid; and/or otherwise manage the invalid prediction and resultant plans.

Propagating the set of predictions to child behaviors of the executing behavior S400 can function to output a set of memory states (e.g., field values) that can be used by downstream behaviors to plan execution plans and/or generate their own predictions. The set of predictions are preferably propagated while executing the execution plan (e.g., contemporaneously with S200), but can additionally or alternatively be performed after S200, and/or at any other suitable time. The set of predictions are preferably propagated by the coordination module, but can additionally or alternatively be propagated by the behaviors (e.g., child behaviors can listen for relevant predictions from parent behaviors), and/or the predictions can be otherwise propagated. However, the set of predictions can be otherwise propagated.

All or a portion of the predictions can be propagated to the child behaviors. In a first variation, all shared variables from the predictions are propagated to the child behaviors. In a second variation, only variables relevant to the child behavior (e.g., specified by the child behavior) are propagated to the child behavior. In a third variation, all world state variables from the predictions are propagated to the child behaviors.

S400 can include, for each prediction: identifying the exit status associated with the prediction; determining the child behavior associated with the exit status based on the graph (e.g., identifying the child behavior connected to the executing behavior with an edge associated with the exit status); and sending the predictions (or a portion thereof) to the determined child behavior. However, S400 can be otherwise performed.

S400 can optionally include prioritizing the predictions for transmission to a child behavior. This can be particularly useful when the prediction generation rate exceeds the child behavior planning and prediction rate, when multiple preceding behaviors are generating predictions to be sent to the child behavior, and/or in other instances. The predictions can be prioritized based on: depth position or graph distance of the generating behavior relative to the executing behavior (e.g., wherein predictions from deeper or further behaviors are deprioritized and predictions from shallower or closer behaviors are prioritized); probability of occurrence; prediction confidence level; estimated processing time (e.g., child behavior planning and prediction time); estimated execution time (e.g., time to execute the remainder of the executing behavior's execution plan; estimated time to execute the child behavior's resultant execution plan); similarity to a prior prediction (e.g., wherein predictions similar to previously analyzed predictions are deprioritized); similarity to a current world state; based on generation timestamp; and/or otherwise prioritized.

Planning child execution plans with the child behaviors S500 can function to determine predetermined child execution plans based on the set of predictions (e.g., predicted values that represent the world state at execution plan completion). Planning child execution plans can be performed periodically while the execution plan is executing (e.g., contemporaneously with S200), but can additionally or alternatively be determined after S200, and/or at any other suitable time. Child execution plans can be planned using: the set of predictions propagated to child behaviors in S300, world states estimated by a state estimation model (e.g., monitoring the current or general world state, based on sensor data, etc.), world states provided by the coordination module, variable values measured by one or more sensors of the system, and/or any other suitable information. One or more child execution plans can be generated for each prediction, each set of realized world states, each permutation of intervening world states (e.g., the intermediate world states that will occur through partial execution of the child execution plan; generated by the prediction model; etc.), and/or other set of data.

The child execution plans can be stored locally at the child behaviors (e.g., in private memory), in shared memory, remotely (e.g., in a database), and/or otherwise stored. The child execution plans are preferably stored with the information used to generate the child execution plan (e.g., the prediction values, the prediction identifier, etc.), but can additionally or alternatively be stored with any other information and/or not stored with information.

In a first variant, planning the child execution plans can include generating control instructions using the planning model of the child behavior.

In a second variant, planning the child execution plans can include looking up control instructions based on the set of predictions from S200, estimated values from the coordination module, and/or measured values from the sensors.

However, the child execution plans can be otherwise planned.

Generating child state predictions of the world state with the child behaviors S600 can function to determine one or more predictions of the world state at child execution plan completion. The child state predictions can be generated periodically while the execution plan is executing (e.g., contemporaneously with S200), but can additionally or alternatively be determined after S200, and/or at any other suitable time. The child state predictions of the set can be generated for different possible child execution plans. The child state predictions associated with different child execution plans can be generated in parallel or in series. The child state predictions associated with the same or different exit status and different real world states can be generated in parallel or in series.

The child state predictions can be dynamically determined as the system executes the (executing behavior's) execution plan (e.g., periodically every second, every 5 seconds, every 10 seconds, every 30 seconds, etc.), and/or at any other suitable time. Child state predictions can be determined for all or a subset of the: incoming prediction, child execution plans generated by the child behavior, updated predictions, updated child execution plans, and/or other datum. The child state predictions can be generated based on the child execution plan, sensor measurements, and/or any other suitable input.

One or more predictions can be generated for each execution plan. Different child predictions can be generated for a given child execution plan based on: different assumptions, different scenarios, different world states, different potential system responses, different variable values (e.g., generated using a random number generator, etc.), and/or otherwise generated.

The child state predictions can include world state variable values for all or a subset of the world state variables. The child state predictions can include: shared variables, local variables, and/or any other suitable set of variables. The child state prediction can be generated using a simulation (e.g., a physics model), a state estimator, and/or any other suitable method. The child state predictions are preferably generated in a similar manner as S300, but can be generated using other methods.

In a first variant, the child state predictions can be generated using the prediction model of the child behaviors. In this example, the prediction model simulates how the world state will change from the world state described by the upstream prediction once the execution plan is executed. The simulation can also output a confidence level (e.g., how confident the model was that execution plan execution plan would result in the prediction). The prediction model can optionally determine a probability of occurrence (e.g., calculated from the world state appearing in N % of the simulated results; calculated based on the probabilities of the intervening world states; otherwise calculated; etc.).

In a second variant, the child state predictions can be generated by querying a third-party model using the received upstream prediction, and receiving one or more predictions of the world state at execution plan completion, in response.

Similar to S300, the child behavior (e.g., child prediction model) can also output a child exit state. The child exit state is preferably determined in the same manner as S300 (but using the child behavior's goal metrics instead of the executing behavior's goal metrics), but can be otherwise determined.

Similar to S300, the child behavior can also invalidate child predictions. The invalid child predictions are preferably determined in the same manner as S300 (but using the child behavior's intermediate states, input prediction validity, or other child behavior-specific data instead of the executing behavior's data), but can be otherwise determined.

However, S600 can be otherwise performed.

Repeating S400-S600 for descendant behaviors of each child behavior S700 can function to determine child execution plans for all child behaviors of the executing behavior (or a subset thereof). The child behaviors can be used in lieu of the executing behavior in S400, the descendant behaviors (of the child behavior, determined based on the graph) can be used in lieu of the child behaviors in S500 and S600, and the child predictions can be used in lieu of the predictions in S500 and S600. However, S400-S600 can be otherwise repeated. Repeating S400-S600 can include preemptively planning different instances of a given behavior (e.g., determining multiple child execution plans) in parallel and/or in series for different inputs on the same or different computing hardware.

When limited computing resources are available (e.g., at the computing system), the child execution plans and predictions can be preemptively determined based on a schedule. The behaviors and/or upstream predictions can be prioritized based on: probability, planning time, proximity to the parent behavior or executing behavior (e.g., depth), and/or otherwise based. Scheduling can include assigning each prediction to each time slot (e.g., using solutions for the "balanced assignment problem," and/or any other suitable algorithm) within a general prediction-processing schedule, or within a behavior-specific processing schedule. However, repeating S400-S600 for descendant behaviors of each child behavior can be otherwise performed.

Determining a realized world state associated with completion of the execution plan S800 can function to determine real values for the physical world state, which can be used to determine a child execution plan that matches the real values. The realized world state is preferably determined after execution completion of the execution behavior, but can additionally or alternatively be determined contemporaneously with S200, and/or performed at any other suitable time. The realized world state is preferably created by (e.g., effected by) the executing behavior through execution plan execution, but can be otherwise realized. The realized world state can be determined using one or more sensors of the system (e.g., using measured values from the sensors); using one or more heuristics; based on the predicted world state associated with the executed behavior; and/or any other suitable information. However, the realized world state can be otherwise determined.

Executing a child execution plan associated with a world state prediction matching the realized world state S900 can function to facilitate execution of the child execution plan immediately after termination of the execution plan to minimize system downtime. The child execution plan is preferably a predetermined execution plan, but can alternatively be dynamically determined. The child execution plan is preferably selected based on the realized predictions of the preceding behavior, but can be otherwise selected.

S900 can include: determining an exit state of the executing behavior (e.g., based on whether the executing behavior's goal was achieved), identifying the child behavior associated with the exit state (e.g., based on the graph), identifying one or more predictions (previously output by the executing behavior) that matches the realized world state (determined in S800), selecting the execution plan(s) associated with (e.g., generated based on) the identified prediction, and executing the selected execution plan.

The matching prediction can be identified by: matching the realized world state to the set of input predictions; by the executing behavior outputting the prediction identifier that predicted all the intermediate world states leading up to the prediction; and/or otherwise identified. The match between the prediction and realized world state can be: a direct match (e.g., all state variable values must match); a substantial match (e.g., all predicted variable values fall within a permissible range of the realized variable value for the respective variable; the predicted values of the world state prediction falling within predetermined ranges of real values of the realized world state; the values for key variables match, wherein each child behavior can define a child behavior-specific set of key variables; etc.); a fuzzy match; and/or otherwise matched.

One or more execution plans can be selected. Alternatively or additionally, subcomponents of one or more execution plans can be selected (e.g., for different objects, for different actuators, different sets of realized variable values, etc.). These subcomponents can be combined into an execution plan (e.g., merged, appended, etc.), or otherwise used.

In an illustrative example, a behavior is asked to grasp two objects A and B. A first incoming prediction (from a parent behavior) assigns positions P_A1 and P_B1 to the objects, and a second incoming prediction assigns positions P_A2 and P_B2 to the objects. If the realized positions are P_A1 and P_B2 when the behavior is requested to execute, then the behavior can use pieces of the plans computed from the incoming predictions, even though the combined state of the world does not match any single prediction. Alternatively, the behavior can recompute the execution plan, or otherwise manage discrepancies between predictions and realized predictions.

Executing the execution plan(s) associated with the identified prediction is preferably performed as discussed in S200, wherein the child behavior becomes the executing behavior, but can be otherwise performed. The entire method can be iteratively repeated as the child behaviors become the executing behaviors.

However, S900 can be otherwise performed.

However, the method can include any other suitable elements that can be otherwise configured.

5. Examples

Figure 6:
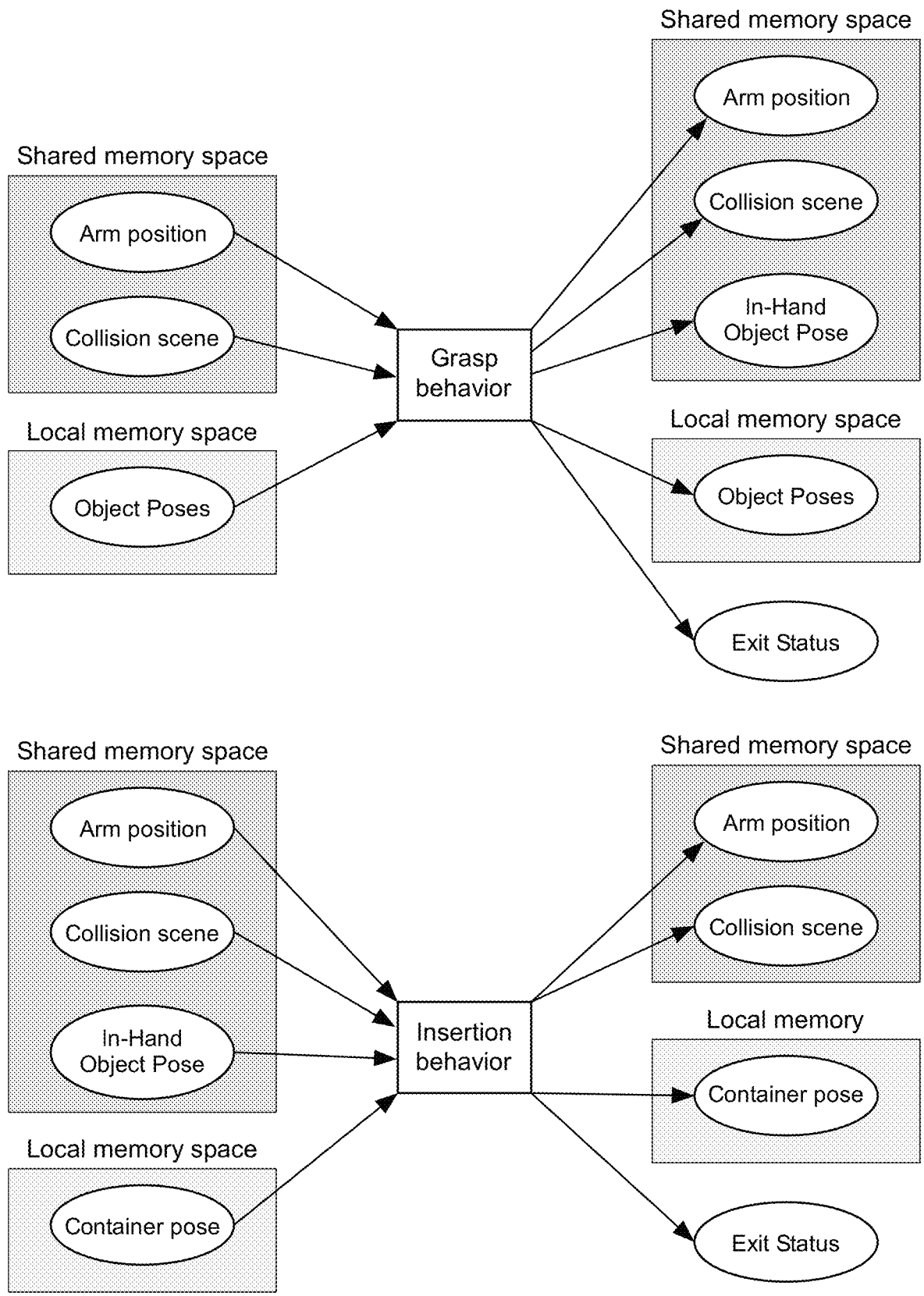
FIG. 6 depicts an example of the system.
Figure 7:
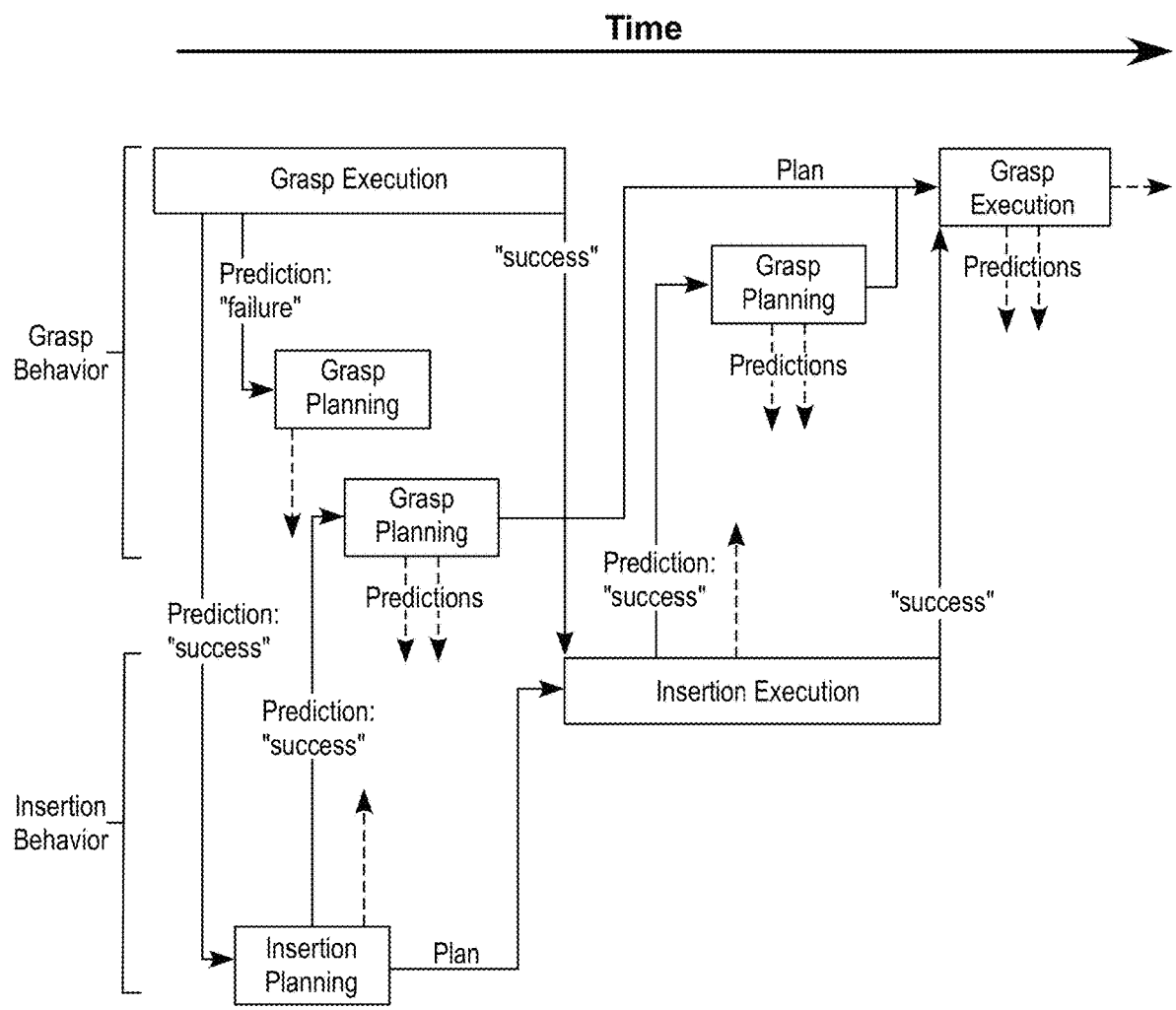
FIG. 7 depicts an example of the system.

In an illustrative example, shown in FIG. 6 and FIG. 7, a PRESMA (PRedictive Extended State MAchine) can include a grasp behavior and an insertion behavior, wherein the insertion behavior is dependent on a successful grasp behavior (and plans an insertion based on the resultant arm pose), and the grasp behavior is dependent on a successful insertion behavior (and plans a grasp based on the resultant arm pose). Both behaviors are provided shared variables (e.g., robot arm position, collision scene, etc.) that are output by a parent behavior, and can also output one or more predictions of shared variable values, wherein each prediction is associated with an exit status and optionally a probability. The output predictions can optionally include local variables (e.g., counters, object poses, etc.). The behaviors can optionally write private variables (e.g., execution plans) to their respective private memory. In operation, while the grasp behavior is executing, the grasp behavior outputs a prediction, which the coordination module receives. The coordination module then forwards this prediction to the insertion behavior. The insertion behavior can: receive one or more predicted grasp outputs (e.g., based on the predicted grasp exit status and/or probability of occurrence), generate one or more execution plans based on each predicted grasp output, generate one or more predicted insertion outputs based on each execution plan and/or predicted grasp output, generate one or more predicted insertion exit statuses based on each execution plan and/or predicted grasp output, and optionally determine a probability of occurrence, wherein the probability can be associated with an exit statues and predicted memory state pair. Subsequent instances of the grasp and insertion behaviors can also preemptively plan and can predict outputs based on parent behavior outputs. Upon execution completion of the grasp behavior, the insertion behavior can select and execute the predetermined execution plan associated with the actual grasp output. Optionally, the execution plan can be constructed from pieces of multiple predetermined execution plans. The system can optionally prune away plans and outputs (e.g., from shared and local memory) that relied upon unrealized grasp outputs or unrealized insertion outputs.

A second example of the method for preemptive planning can include: at a behavior that is running, outputting predictions of the shared memory that will result after the behavior finishes running (e.g., up to 2 predictions, up to 3 predictions, up to 5 predictions, up to 10 predictions, etc.); monitoring each of the behaviors for new outgoing predictions and propagating the outgoing predictions to subsequent behaviors (e.g., according to the graph's routing, which can be orchestrated by the coordination module, the behaviors, or any other component); at each behavior, listening for incoming predictions and computing or updating an execution plan using the incoming predictions (e.g., such as depicted in FIG. 7); at the coordination module, when a behavior finishes running, removing predictions that did not occur and informing all upcoming behaviors of any incoming predictions that are no longer valid; at the coordination module, informing all downstream behaviors of any incoming predictions that are no longer valid due to a modification or removal of an outgoing prediction by a behavior; and/or any other suitable elements. When the behavior receives new sensory information, the behavior can make new (e.g., more accurate) predictions, which can be used by downstream behaviors to generate more accurate execution plans (e.g., can use prior execution plans to generate new execution plans). The behavior can additionally make new (e.g., more accurate) predictions without new sensory information (e.g., if an anytime algorithm is running to constantly improve the motion, which then changes the predicted execution result).

Computing an execution plan using the incoming prediction can include outputting additional predictions based on the execution plan, which enables the coordination module to plan for more than one behavior ahead in time. In a first example, if behavior A is currently executing, one of its predictions can lead to behavior B, which can then lead to behavior C. If B runs very quickly, then it is useful for C to begin planning while A is still running, since C will not have enough time to plan while B runs. However, behaviors can be otherwise configured to perform preemptive planning.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

I claim:

1. A system comprising one or more computers and one or more storage devices storing instructions that, when executed by the one or more computers, cause the one or more computers to perform operations comprising:
   storing data defining a set of behaviors, each behavior comprising a planning model and a prediction model;

storing data defining a graph representing the set of behaviors and defining a set of hierarchical dependencies between the behaviors;

generating, during execution of a current execution plan by a physical robot, the current execution plan being associated with a current behavior represented in the graph, a plurality of world state predictions associated with a plurality of respective exit statuses of the current behavior, the predictions being output by the prediction models of the set of behaviors;

propagating the world state predictions to respective child behaviors of the current behavior associated with the current execution plan;

pre-generating, for each child behavior based on a different world state prediction for the child behavior, an execution plans for the child behavior; and generating control instructions for the physical robot to execute a sequence of pre-generated execution plans associated with child behaviors represented in the graph according to a comparison between a realized world state as the robot executes each execution plan and predicted world states associated with each child behavior represented in the graph, comprising:

generating control instructions for the physical robot based on a first pre-generated execution plan in the sequence of pre-generated execution plans associated with child behaviors;

operating the physical robot in accordance with the control instructions of the first pre-generated execution plan;

after operating the physical robot in accordance with the control instructions of the first pre-generated execution plan, generating control instructions for the physical robot based on a second pre-generated execution plan in the sequence of pre-generated execution plans associated with child behaviors; and operating the physical robot in accordance with the control instructions of the second pre-generated execution plan.

2. The system of claim 1, wherein the system further comprises a sensor configured to measure a value of a variable of the realized world state, and wherein the operations further comprise:

updating the world state predictions of the respective child behaviors with the measured value of the realized world state.

3. The system of claim 1, wherein the operations further comprise:

pre-generating, for each child behavior based on the different world state prediction for the child behavior, a child state prediction.

4. The system of claim 1, wherein the graph defining the set of hierarchical dependencies between the behaviors comprises a sub-graph defining a set of hierarchical dependencies between sub-behaviors.

5. The system of claim 4, wherein the world state predictions output by the sub-behaviors comprise encapsulated states accessible only by other sub-behaviors within the system sub-instance and shared states accessible by the behaviors within the system.

6. The system of claim 1, wherein each world state prediction is associated with an occurrence probability, and wherein propagating the world state predictions to respective child behaviors of the current behavior associated with the current execution plan comprises:

propagating the world state predictions in accordance with the occurrence probability.

7. The system of claim 1, wherein the world state is a state of a physical world.

8. The system of claim 1, wherein the world state predictions and child state predictions each comprise:

shared memory propagated to other behaviors;

local memory propagated to subsequent instances of the parent and child behavior, respectively;

an exit status comprising a prediction of execution plan execution outcome; and a probability of occurrence.

9. The system of claim 1, wherein the set of behaviors comprise at least one of a grasping behavior and an insertion behavior.

10. The system of claim 1, wherein the child behavior represents a physical action of the physical robot that can be performed after execution of the current execution plan by the physical robot.

11. A method for operating a physical robot, the method comprising:

storing data defining a set of behaviors, each behavior comprising a planning model and a prediction model;

storing data defining a graph representing the set of behaviors and defining a set of hierarchical dependencies between the set of behaviors;

generating, during execution of a current execution plan by a physical robot, the current execution plan being associated with a current behavior represented in the graph, a plurality of world state predictions associated with a plurality of respective exit statuses of the currently executing behavior, the predictions being output by the prediction models of the set of behaviors, propagating the world state predictions to respective child behaviors of the current behavior associated with the current execution plan;

pre-generating, for each child behavior based on a different world state prediction for the child behavior, an execution plan for the child behaviors; and generating control instructions for the physical robot to execute a sequence of pre-generated execution plans associated with child behaviors represented in the graph according to a comparison between a realized world state as the robot executes each execution plan and predicted world states associated with each child behavior in the graph, comprising:

generating control instructions for the physical robot based on a first pre-generated execution plan in the sequence of pre-generated execution plans associated with child behaviors;

operating the physical robot in accordance with the control instructions of the first pre-generated execution plan;

after operating the physical robot in accordance with the control instructions of the first pre-generated execution plan, generating control instructions for the physical robot based on a second pre-generated execution plan in the sequence of pre-generated execution plans associated with child behaviors; and operating the physical robot in accordance with the control instructions of the second pre-generated execution plan.

12. The method of claim 11, wherein the comparison between the predicted world state associated with each child behaviour and the realized world state as the robot executes each execution plan is determined based on values of the predicted world state falling within predetermined ranges of values of the realized world state.

13. The method of claim 11, further comprising, when multiple world state predictions are available to a child behavior, prioritizing the world state predictions for child execution plan planning and child state prediction generation.

14. The method of claim 13, wherein the world state predictions are prioritized based on estimated planning time.

15. The method of claim 11, wherein the hierarchical dependencies comprise exit statuses, wherein a first exit status is associated with a first edge from a first behavior to a second behavior within the graph, and wherein a second exit status is associated with a second edge from the second behavior to the first behavior.

16. The method of claim 11, further comprising, passing shared memory up to a super-instance of the graph while locally operating based on encapsulated memory.

* * * * *